No. 812,103. PATENTED FEB. 6, 1906.
E. L. P. TURENNE.
LIGHT PROJECTOR.
APPLICATION FILED JUNE 5, 1905.

2 SHEETS—SHEET 1.

UNITED STATES PATENT OFFICE.

EMILE LÉON PAUL TURENNE, OF PARIS, FRANCE, ASSIGNOR TO THE FIRM OF BARBIER, BENARD & TURENNE, OF PARIS, FRANCE.

LIGHT-PROJECTOR.

No. 812,103.     Specification of Letters Patent.     Patented Feb. 6, 1906.

Application filed June 5, 1905. Serial No. 263,838.

*To all whom it may concern:*

Be it known that I, EMILE LÉON PAUL TURENNE, a citizen of France, residing at Paris, in the Republic of France, have invented a new and useful Improvement in Light-Projectors, of which the following is a specification.

Every projector is composed in principle of an optical device and a source of light placed in the center of this device, so as to produce as homogeneous and parallel a beam of light as possible. In most of the existing projectors the optical device is made of a glass mirror worked and plated on its exterior. Now the plating shows the serious inconvenience that at sea it soon deteriorates and requires to be frequently done over again. To remedy this inconvenience, it has been proposed to substitute glass rings for this mirror analogous to those used in lighthouses, which rings do not require to be plated. They had, however, to be abandoned, because on account of their lacking accuracy and owing to the absence of what is generally called "overlapping" luminous cones were formed, which passed between the rings, and also because for the central part dioptric rings were taken which gave coloration.

This invention has for its object a projector which by the use of a rational system of catadioptric cut-glass rings presenting an overlapping profile obviates the inconveniences cited.

Figure 1:
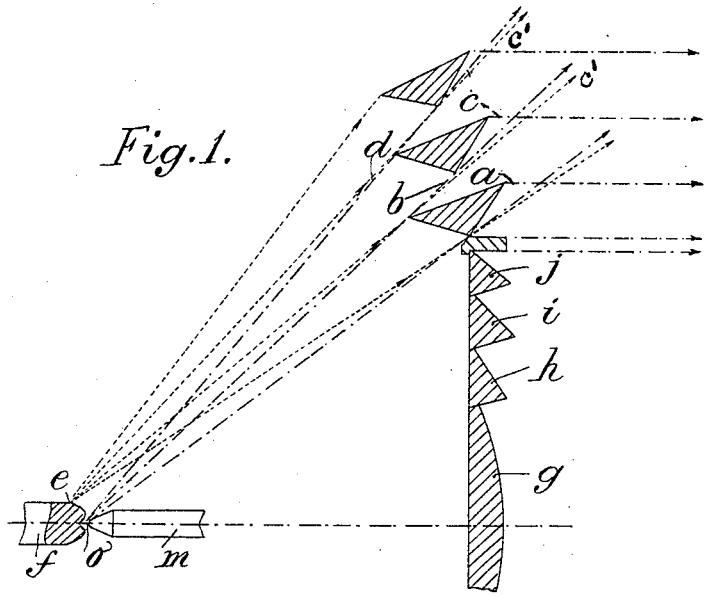
Figure 2:
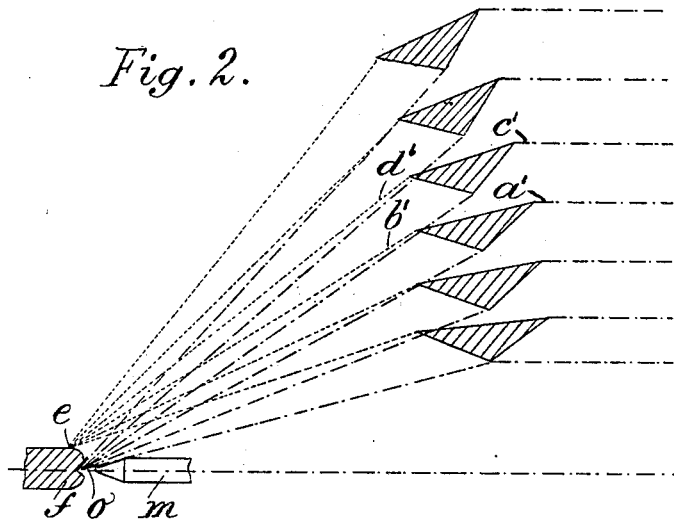
Figure 3:
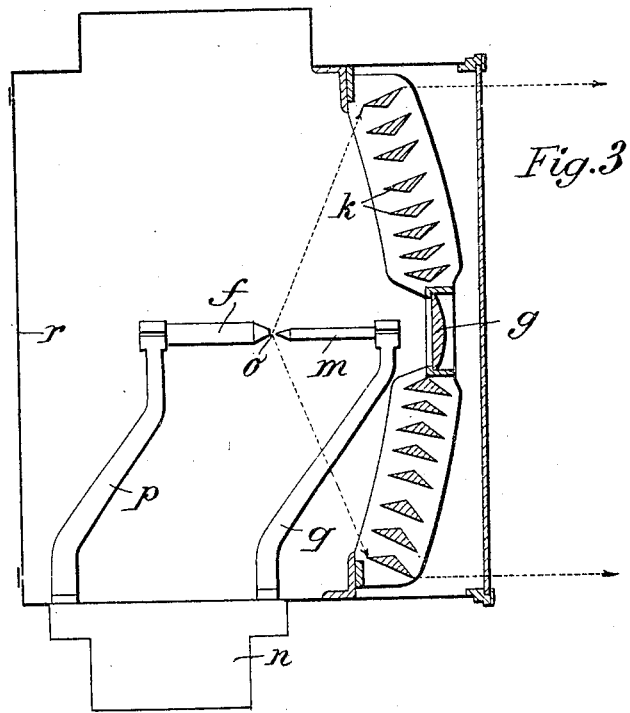
Figure 4:
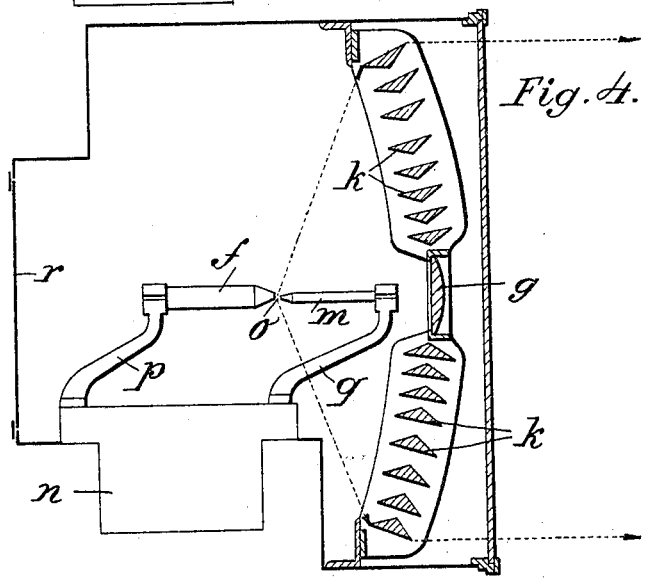

In the annexed drawings, Figure 1 shows in section an outline lighthouse of rings as designed by Fresnel. Fig. 2 is a section showing the course of the rays of light in an overlapping profile. Fig. 3 shows in section a projector constructed according to the present invention with an optical device formed of catadioptric rings in which the body of the lamp is situated on the outside of the projector. Fig. 4 shows in section an analogous projector, but in which the body of the lamp is placed within the periphery of the optical device.

The outline of the lighthouse-rings planned by Fresnel, Fig. 1, is carried out on the supposition that the source of light is reduced to a point $o$—that is to say, the lines such as $a\,b$ pass through the point $o$, as well as the lines such as $c\,d$. Now if, as is the case in practice, the source of light placed in the focus of the device consists of an electric arc which is not reduced to a point, but presents, on the contrary, comparatively large dimensions it is seen that the rays of light, such as $e\,c$, will pass between the rings and will form luminous cones, which cannot on any account be allowed in a projector.

In a so-called "overlapping" profile—Fig. 2, for instance—lines $a'\,b'$ instead of passing through the point $o$, as hitherto, meet at point $e$, the limit of the glowing part of the crater of the positive carbon $f$. The lines $c'\,d'$ also pass through point $e$, thus suppressing the luminous cones in question.

In lighthouse-lenses devised as shown in Fig. 1 the central part is composed of a lens $g$, surrounded by several rings $h\,i\,j$, called "dioptric" rings, which produce double refraction and give colored light, whereas in the case of catadioptric rings, which always give white light, a double refraction and a reflection on one of the surfaces is produced. It is on this account that in projectors devised according to the present invention, Figs. 3 and 4, a system is used exclusively composed of catadioptric rings $k$, cut with the greatest accuracy and overlapping each other, according to an arrangement resembling somewhat that used in certain lighthouses. Nevertheless the central lens $g$ may be maintained, as shown in Figs. 3 and 4. This lens is of no importance, because, owing to the cone of shadow produced by the small negative carbon $m$, practically no light falls upon this lens.

The body $n$ of the lamp can be arranged on the outside of the projector, as shown in Fig. 3. As, however, in the optical system of lighthouse-rings it need not be feared that the body of the lamp will produce occultation, as is the case in former mirror projectors, it is no longer necessary that this body $n$ be placed on the outside of the largest diameter of the optical device. As shown in Fig. 4, the said body $n$ may be approached to the focal plane, so as to diminish the length of the carbon-carriers $p\,q$, and thus reduce the bulk of the projector. This arrangement is of much interest as regards large diameters, as in mirror projectors the carbon-carriers must be at least equal to half the length of the diameter of the optical device, whereas in the present arrangement the dimensions of the carbon-carriers $p\,q$ may be as much reduced as desired. Apart from this and the suppression of the plating a projector constructed according to the present invention shows the advantage, among others, that the optical device can be composed of separate rings, which allows of their being easily replaced not only as whole rings, but also in parts of these rings. The breakage of a part of a ring does not impede operation, and the cost of repair is small compared with that of replacing a broken mirror. The supervision of the projector is also greatly facilitated, as it is sufficient to open the door r at the back to have access to the lamp, and the door can even be opened during operation. Finally, one is no longer tied to dimensions, as in the case of large mirrors, the weight and fragility of which increase with the diameter, whereas with separate rings the projectors may be made of as large a diameter as desired.

What I claim by my invention, and desire to secure by Letters Patent, is—

In a projector, the combination with a source of light, of an optical device comprising a substantially concentric series of catadioptric glass rings arranged in a curve with an overlapping profile, substantially as described.

In witness whereof I have hereunto set my hand, this 23d day of May, 1905, in the presence of the subscribing witnesses.

EMILE LÉON PAUL TURENNE.

Witnesses:
 DOUGLAS HORACE BRANDON,
 HANSON C. COXE.